Jan. 3, 1950     C. S. GUSTAFSON     2,493,244

ADJUSTABLE ROLLER CUTTER FOR CUTTING FOOD

Filed July 8, 1946

INVENTOR.
Charles S. Gustafson
BY
Att'y

Patented Jan. 3, 1950

2,493,244

UNITED STATES PATENT OFFICE 2,493,244

ADJUSTABLE ROLLER CUTTER FOR CUTTING FOOD

Charles S. Gustafson, San Mateo, Calif.

Application July 8, 1946, Serial No. 681,960

1 Claim. (Cl. 30—307)

1

This invention relates to improvements in cutters, and has particular reference to a cutter for cutting foods such as bakers' dough, or any other similar commodity.

The principal object of this invention is to provide a plurality of cutters which may be regulated as to distances apart, in order that strips of material may be readily cut thereby, all of which strips will be of a uniform width.

A further object is to produce a device of this character which is easy to use, one which is sanitary and one which may be readily transported from place to place.

A further object is to produce a device which is economical to manufacture and therefore one which may be retailed at a reasonable price.

Other objects and advantages will be apparent during the course of the following description.

In the accompanying drawings forming a part of this specification and in which like numerals are employed to designate like parts throughout the same, Fig. 1 is a top plan view of my device, portions thereof being shown in cross section.

In bakeries it is often necessary to cut large quantities of rolled dough into strips for the purpose of making various bakery products; also in manufacturing macaroni strips of various sizes must be cut.

With my device it is possible to cut a plurality of strips all at the same time, all of the strips being of uniform width, or if desired, squares may be cut by first using my device in one direction and then cutting at a ninety degree angle thereto. It is also true that diamond-shaped pieces may be cut in a similar manner.

In the accompanying drawings wherein for the purpose of illustration is shown a preferred embodiment of my invention, the numerals 5 and 6 refer to freely rotatable handles which are mounted on stub-shafts, as shown at 7 and 8 respectively. These stub-shafts are formed upon cross pieces, as shown at 9 and 11 respectively, which cross pieces are connected by parallel rods 12 and 13.

Mounted between these rods and rotatable in the cross pieces is a threaded member 14 which is provided with a right hand thread at one end and a left hand thread at the opposite end. This threaded member 14 may be rotated by a thumb-nut 16.

Figure 1:
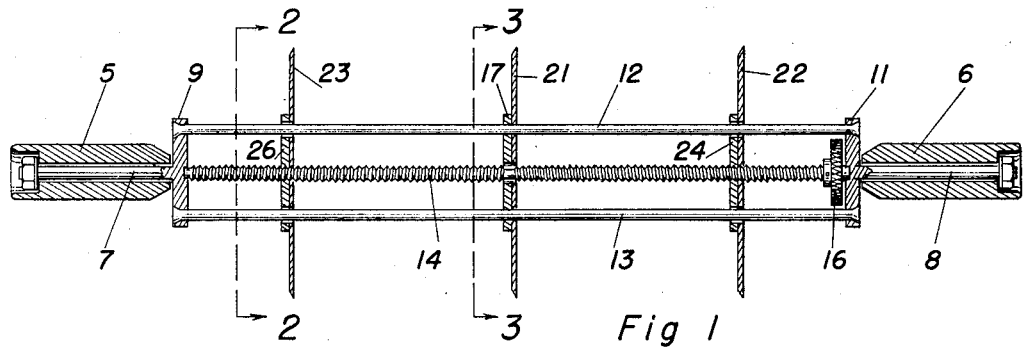
Figure 2:
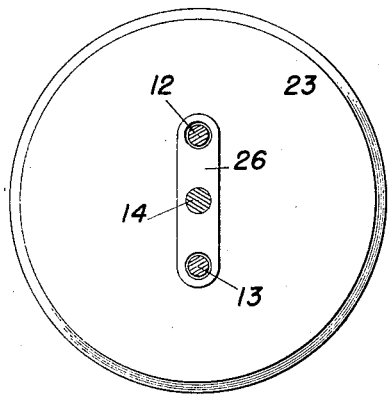
Fig. 2 is a cross-sectional view taken on the line 2—2 of Fig. 1.
Figure 3:
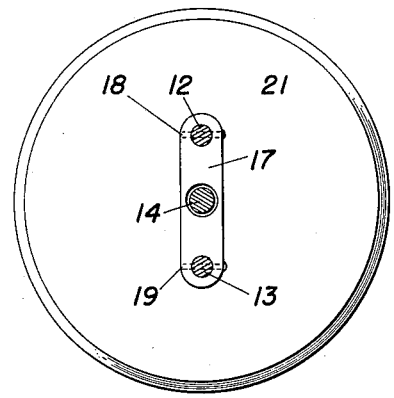
Fig. 3 is a cross-sectional view taken on the line 3—3 of Fig. 1.
Figure 4:
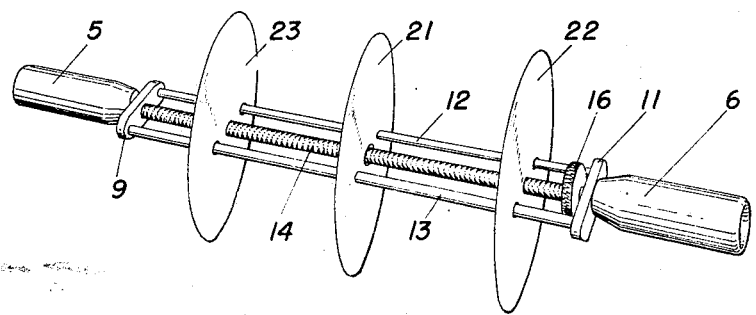
Fig. 4 is a perspective view on a reduced scale.

Positioned midway between the cross pieces 9 and 11 is a cross piece 17 which is pinned to the rods 12 and 13 as shown at 18 and 19 (see Fig. 3). This serves to mount a cutting disc 21 and

2 similar cutting discs are shown at 22 and 23 which cutting discs are each mounted upon a cross piece as shown at 24 and 26 respectively and have threaded engagement with the threaded rod 14.

The result of this construction is that when the device is used in a manner similar to that of using a rolling pin, then the discs 23, 21 and 22 will cut through any dough over which the device is rolled and will cut strips equal to the distance between the discs 23 and 21 and 21 and 22.

Now, if it is desired to increase or decrease the width of the strips to be cut, then it is necessary to merely rotate the thumb-nut 16, which in turn will rotate the threaded member 14 and cause the cutters 22 and 23 to move toward the cutter 21 and away therefrom, depending upon the direction of the rotation of the thumb-nut.

It will therefore be apparent that I have produced a device which will accomplish all of the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

In a device of the character described, a pair of spaced cross pieces, parallel rods connecting said cross pieces, a plurality of cutting discs slideably mounted on said cross pieces, each of said cross pieces having a stub shaft extending therefrom, handles rotatively mounted on said stub shafts, and a threaded member extending between said cross pieces and mounted parallel to said rods, said threaded member being provided with a right-hand thread at one end and a left-hand thread at its opposite end, said right and left-hand threads each engaging one of the cutting discs, and means for rotating said threaded member to cause said discs to move toward or away from an interposed disc immovably positioned on said parallel rods.

CHARLES S. GUSTAFSON.

REFERENCES CITED

The following references are of record in the file of this patent:

UNITED STATES PATENTS

| Number | Name | Date |
|---|---|---|
| 1,546,676 | Ricci | July 21, 1925 |

FOREIGN PATENTS

| Number | Country | Date |
|---|---|---|
| 604,657 | Germany | Oct. 25, 1934 |